2,937,362
SAFETY FLASHER UNIT FOR TRACTORS AND THE LIKE

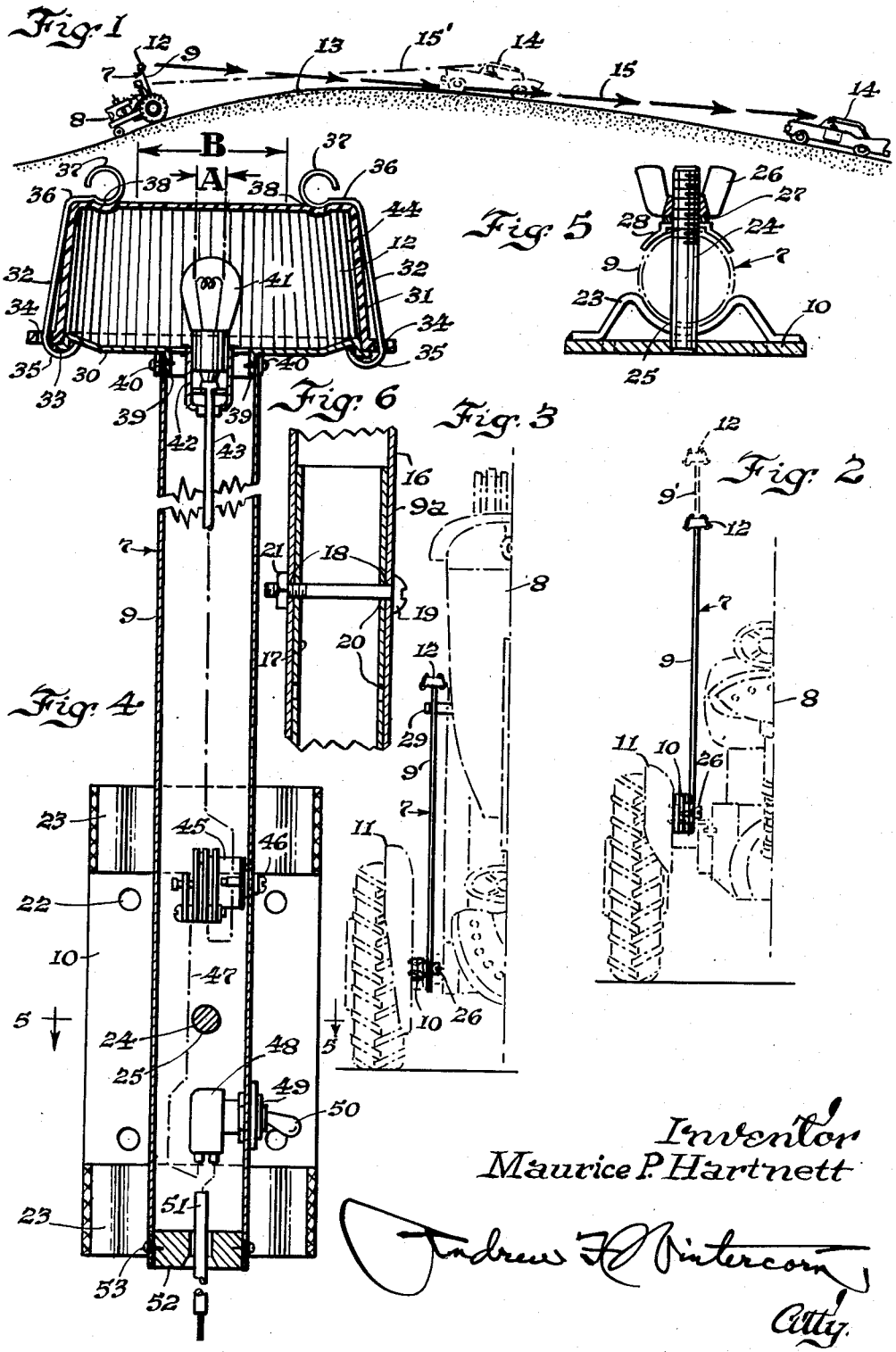
May 17, 1960     M. P. HARTNETT     2,937,362
SAFETY FLASHER UNIT FOR TRACTORS AND THE LIKE
Filed Feb. 11, 1957
Inventor
Maurice P. Hartnett United States Patent Office 2,937,362
Patented May 17, 1960

Maurice P. Hartnett, Rockford, Ill., assignor to Design Engineers, Rockford, Ill., a copartnership Application February 11, 1957, Serial No. 639,517

3 Claims. (Cl. 340—87)

This invention relates to a safety flasher unit designed for use on tractors and the like, with a view to warning the drivers of any cars in the vicinity of the slow-traveling tractor or other vehicle, many serious highway accidents having resulted, for example, from slow-moving tractor-drawn agricultural implements on highways at any time of day but especially at dusk, the farmer in such situations feeling secure because at his slow speed he can see well enough to drive without lights, not realizing that a motorist traveling perhaps 60 or 70 miles per hour is apt to bear down upon him before either is aware of the other, so that even if ordinary lighting were used, the difficulty would still exist to a large extent.

According to my invention, a mast of appreciable length in relation to the height of the tractor is mounted on the tractor, preferably on the rear left fender, and carries a flasher signal light on its upper end, which, because of the length of the mast, is certain of being seen over the crest of a neighboring hill, and, because of the danger indicated by such a light the chances are that the average driver in such a situation would immediately respond and slow up sufficiently to avoid a collision. The mast is tubular and of sufficient diameter for the requisite rigidity and to enable housing the wires necessary and also a flasher switch unit and a manually operable switch so that all current-carrying elements are protected against dirt and moisture and there is accordingly no danger of shorts. The mast is, furthermore, provided with means for clamping the same in either of two positions, there being a pivot bolt on the mounting bracket spaced midway between two vertically spaced seats in which the mast fits, and this bolt has a wing nut on its outer end which can be tightened to clamp the mast in the vertical operative position or in a horizontal inoperative or out-of-the-way position, the mast in the latter position finding additional support at its outer end on another bracket provided therefor on the tractor. While the mast is preferably of one-piece construction, provided in whatever length is needed for safe operation in a given region, I may provide the mast of two-piece construction, the two sections telescoping and having a bolt passed through registering holes in the sections, the outer section requiring only two diametrically opposed holes for reception of the bolt and the inner section having a plurality of pairs of such holes provided therein in a predetermined vertically spaced relationship, so that in any position of adjustment the mast is just as rigid as a one-piece mast, if not more so, and there are no holes left uncovered for entry of moisture.

The invention is illustrated in the accompanying drawing in which—

Fig. 1 is a diagrammatic view illustrating a tractor equipped with a safety flasher light in accordance with my invention, showing how the danger signal is visible over the crest of a neighboring hill to a driver of an approaching car in ample time to avoid collision;

Fig. 2 is a rear-view of a tractor shown in phantom, with the safety flasher unit of the invention shown in full lines in raised operative position;

Fig. 3 is a plan view of the tractor shown again in phantom, with the safety flasher unit shown in full lines in the horizontal inoperative position;

Fig. 4 is a longitudinal section through the safety flasher unit, an intermediate portion of the length of the mast being broken away to enable showing the parts on a larger scale;

Fig. 5 is a cross-section on the line 5—5 of Fig. 4; and

Fig. 6 is a longitudinal sectional detail through the bolted connection between the telescoping sections of a two-piece adjustable length mast.

Similar reference numerals are applied to corresponding parts throughout the views.

Referring first to Figs. 1 to 3, the reference numeral 7 designates a safety flasher light unit made in accordance with my invention shown applied to a tractor 8, 9 being the mast of appreciable length carried on a supporting bracket 10 mounted on the rear left fender 11 of the tractor and carrying the flasher light 12 on its upper end at a sufficient elevation above the tractor so that the danger signal is clearly visible over the crest of a neighboring hill 13 to the driver of an approaching car 14 as indicated by the arrows 15 in Fig. 1, giving the driver ample time and space within which to slow down sufficiently to avoid a collision, whereas without such a signal, as indicated in the dotted line position of the car 14 and the dot and dash line 15′, the car would be too close up before the driver was aware of the tractor to avoid collision. A difference in length of the mast 9 of just a foot or two as indicated by the dotted line extension 9′ in Fig. 2 makes considerable difference in the distance to which the flasher light 12 may be seen over the crest of a neighboring hill or hills and that, strangely enough, is something that has not evidently been appreciated before my invention or surely such a provision would have been made sooner, considering the large number of serious accidents which the lack of such safety precautions has entailed, and it must of course be kept in mind that farmers driving tractors along highways at dusk and other times of day are not by any means the only offenders, because there are plenty of cases where highway maintenance equipment has also been involved in similar accidents arising from the same absence of safety precautions. Any slow-moving vehicle, in other words, is a serious hazard on a highway at any time of day or night and measures such as the one herein disclosed should be taken in the interest of public safety to give motorists fair warning with a view to at least reducing, if not entirely eliminating, these serious accidents.

While I prefer that the masts 9 be of one-piece construction for simplicity and economy, and that they be available in whatever lengths are considered to afford the desired safety in a given region, having due regard to the kind of hills where the vehicles so to be protected operate, I may provide masts of two-piece construction, as shown at 9a in Fig. 6, in which the numeral 16 designates the outer and upper tubular section and 17 the inner and lower tubular section, the sections being in telescoping relation, and the section 16 having one pair of diametrically opposed holes 18 provided therein to accommodate the connecting bolt 19, the inner section 17 having a plurality of pairs of diametrically opposed holes 20 in vertically spaced relation through which the bolt 19 can be passed to fasten the sections in adjusted relationship. In that way the mast may be lengthened or shortened to the length considered to best suit the needs of a given locality, and one unit may be sold for use throughout a much wider territory, if not throughout the whole country. Also, since the holes 20 are provided in the inner section and sufficient over-lap is provided between the sections 16 and 17 there is no objection by reason of holes 20 being left uncovered in any position of adjustment. A nut 21 threaded on the projecting end of the bolt 19 serves when tightened to lock the parts in adjusted relationship.

Referring next to Figs. 2, 3, 4, and 5, it will be seen that the bracket 10, which is suitably secured to the fender 11 by bolts entered through holes 22, has U-shaped seats 23 provided on the opposite ends thereof in vertical alignment in which the lower end portion of the mast 9 fits for rigid support in the vertical operative position, a horizontal bolt 24 being provided at the center of the bracket 10 mid-way between these seats and entered through diametrically opposed holes 25 provided therefor in the mast and having a wing nut 26 threaded on its outer end portion against a lock washer 27 and clamping plate 28 mounted on the bolt, whereby to enable clamping the mast securely in the vertical position. The wing nut 26 can of course be loosened to permit swinging the mast 9 about the bolt 24 as an axis to the horizontal out-of-the-way position shown in Figure 3, in which position the outer end portion of the mast carrying the flasher light 12 is adapted to rest on a bracket 29 provided therefor on the frame of the tractor 8 in forwardly spaced relation to the bracket 10. The wing nut 26 can be tightened to clamp the mast 9 in that position also. In the case of a two-piece telescoping type mast 9a, the bolt 24 is, of course, entered through diametrically opposed holes 25 in the lower, inner section 17.

The flasher light 12 is of only five-piece construction for simplicity and economy, as well as ease of replacement, and ease of assembly and disassembly, the same including a bottom disc 30 of sheet metal construction, a lens 31 of cupped form and preferably molded of plastic material, and three spring clips 32 in equal circumferentially spaced relation for the snap fastening of the lens 31 down onto the rim 33 provided on the disc 30. The clips 32 are entered through eyes 34 provided in the form of integral projections on three sides of the lens 31 and have hook ends 35 which engage under the rim 33, while the other end portions 36 of the clips, which are bent inwardly toward each other, have looped extremities 37 arranged to engage in depressions 38 provided in the top wall of the lens 31, these looped extremities riding over the top of the lens and snapping down into the depressions 38 to lock the clips in place holding the lens 31 securely assembled on the disc 30. The disc 30 has diametrically opposed lugs 39 projecting downwardly from the central portion thereof which when entered in the end of the mast 9, or in the end of the section 16 of mast 9a, receive sheet metal screws 40 entered through holes provided therefor in the end of the mast and registering holes provided in the lugs. A lamp bulb 41 of suitable voltage is mounted in a socket 42 suitably secured in the center of the disc 30 and projecting downwardly into the mast, one terminal of the lamp bulb being grounded and the other terminal having a wire 43 extending therefrom for connection with the battery of the tractor or other vehicle on which the flasher unit is mounted. The magnification effect of the ribs 44 molded integrally with the side walls of the lens 31 on the inside is indicated by the dimensions A and B in Fig. 4 and with such magnification the danger signal is easily noticeable at a considerable distance and a driver's attention is certain of being attracted, especially when the lens 31 is properly colored, like red, amber or violet, particularly with the light being flashed on and off. A flasher switch 45 is provided on the inside of the mast and has one side thereof connected with the wire 43 and fastened securely by means of one or more screws 46. Switch 45 is suitably connected electrically, as at 47, with one side of a manually operable switch 48 that is mounted in the wall of the mast 9, as indicated at 49, with the handle 50 thereof outside. Another wire 51 extends from the other side of switch 48 out through a center hole in a wooden plug 52 for connection with the ungrounded terminal of the battery on the tractor. The plug 52 serves as a closure for the end of the mast and is suitably secured in place by pins 53 entered through holes provided therefor in the wall of the mast.

It will, therefore, be clear that all of the working parts are nicely protected inside the mast 9 and there is no danger of shorts by reason of dirt and/or moisture getting in. Even if a short did occur there would be no hazard involved, due to the low voltage employed. A farmer or mechanic can, with the aid of simple instructions furnished with the unit, install it on any tractor or other vehicle. When the unit is not in use or must be lowered for head room, it is out of the way and nicely protected. When it is to be used it is a simple matter to swing the mast up to the vertical position and clamp it, and the light can be turned on or off by operation of the switch handle 50. Vehicles traveling along a highway at a slow speed at any time of day or night are well-protected with a unit like that herein described and serious collisions can be avoided.

It is believed the foregoing description conveys a good understanding of the objects and advantages of my invention. The appended claims have been drawn to cover all legitimate modifications and adaptations.

I claim:

1. The combination of a motor vehicle having rear wheels provided with fenders in spaced relation to an elongated body, an elongated bracket mounted in a substantially vertical plane on one of said fenders and having vertically aligned depressions provided therein at the upper and lower ends thereof, a bolt extending horizontally from an intermediate portion of said bracket between said depressions, a mast of appreciable length in relation to the length and height of said vehicle pivotally mounted at its one end on said horizontal bolt for movement from a substantially horizontal retracted inoperative position alongside the body of said vehicle to a substantially vertical operative position, said bolt securing said mast detachably in the vertical position engaged in the depressions in said bracket, whereby to prevent pivotal movement of said mast about said bolt as an axis, a secondary bracket on the body of said vehicle in forwardly spaced relation to the first-mentioned bracket on which said mast is adapted to rest in retracted position, and a warning signal mounted on the free end of said mast.

2. The structure set forth in claim 1, wherein the mast is of two-piece telescoping construction for adjustability as to overall length, the one piece being pivoted on said bolt and the other piece carrying the warning signal on its outer end, and means for securing the two pieces of said mast in adjusted relationship to one another.

3. The structure as set forth in claim 1, wherein the warning signal is an electric light and wherein the mast is hollow and of enlarged diameter both for increased rigidity and to afford increased space inside the same, the structure including a manual control switch and an automatic flasher switch housed inside the mast for protection from moisture and dirt, the manual switch having a manually operable member projecting through the wall of the mast for operation outside the same, the two switches being electrically connected in series between the warning light and a source of electric current.

References Cited in the file of this patent

UNITED STATES PATENTS

| 1,834,682 | Colstad | Dec. 1, 1931 |
| 1,927,319 | Michel et al. | Sept. 19, 1933 |
| 2,127,760 | Staley | Aug. 23, 1938 |
| 2,260,253 | Johnson | Oct. 21, 1941 |
| 2,496,601 | Schamblin | Feb. 7, 1950 |
| 2,512,167 | Mirandi | June 20, 1950 |
| 2,704,839 | Sweet | Mar. 22, 1955 |
| 2,738,492 | Arneson et al. | Mar. 13, 1956 |

FOREIGN PATENTS

| 267,419 | Great Britain | Mar. 17, 1927 |
| 757,609 | France | Oct. 10, 1933 |